(12) United States Patent
Reed et al.

(10) Patent No.: US 10,575,466 B2
(45) Date of Patent: Mar. 3, 2020

(54) MODULAR MOUNTING SYSTEM FOR A COTTON HARVESTER

(71) Applicant: Deere & Company, Moline, IL (US)

(72) Inventors: Barrett D. Reed, Pella, IA (US); Kevin J. Goering, Cambridge, IA (US); Michael S. Garton, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 173 days.

(21) Appl. No.: 15/817,862

(22) Filed: Nov. 20, 2017

(65) Prior Publication Data

US 2019/0150362 A1    May 23, 2019

(51) Int. Cl.
*A01D 46/08* (2006.01)
*A01D 67/00* (2006.01)

(52) U.S. Cl.
CPC .......... *A01D 46/084* (2013.01); *A01D 67/00* (2013.01)

(58) Field of Classification Search
CPC ...... A01D 46/084; A01D 67/00; A01D 41/12; Y10S 180/90; Y10S 56/09; Y10S 414/132; A01F 12/185; B62D 63/025; B62D 21/11; B62D 25/082; B62D 43/045; B62D 49/06
See application file for complete search history.

(56) References Cited

U.S. PATENT DOCUMENTS

| | | | | |
|---|---|---|---|---|
| 2,719,394 A * | 10/1955 | Thomann | A01D 46/08 | 180/324 |
| 3,425,194 A * | 2/1969 | Frushour | A01B 51/026 | 172/273 |
| 4,060,960 A * | 12/1977 | Hengen | A01D 41/02 | 56/14.6 |
| 4,150,525 A * | 4/1979 | De Busscher | A01D 67/00 | 460/119 |
| 4,164,985 A * | 8/1979 | Bobard | A01B 59/043 | 172/439 |
| 4,846,198 A * | 7/1989 | Carnewal | A01D 41/00 | 460/21 |
| 4,862,683 A * | 9/1989 | Bragg | A01D 46/00 | 56/330 |
| 5,024,052 A * | 6/1991 | Bragg | A01D 46/00 | 56/330 |
| 5,029,436 A * | 7/1991 | Fredriksen | A01D 41/04 | 180/89.13 |
| 5,299,334 A * | 4/1994 | Gonzalez | A61G 7/005 | 5/607 |
| 5,993,133 A * | 11/1999 | Murray | B62D 43/045 | 224/42.12 |
| 6,606,845 B1 * | 8/2003 | Spies | A01D 34/81 | 56/16.7 |
| 6,701,701 B2 * | 3/2004 | Wigdahl | A01D 46/08 | 56/16.6 |

(Continued)

FOREIGN PATENT DOCUMENTS

WO    WO-2011043744 A1 *    4/2011    ............ A01D 45/10

*Primary Examiner* — Arpad Fabian-Kovacs
(74) *Attorney, Agent, or Firm* — Taft Stettinius & Hollister LLP (57) ABSTRACT

A frame assembly for a work machine having a primary frame member and a prime mover platform removably coupled to the primary frame member. Wherein the prime mover platform is configured to selectively couple a prime mover to the primary frame member.

17 Claims, 6 Drawing Sheets

(56) References Cited

U.S. PATENT DOCUMENTS

| | | | | |
|---|---|---|---|---|
| 6,875,103 B2* | 4/2005 | Matousek | ............ | A01F 12/185 |
| | | | | 296/190.04 |
| 6,941,740 B2* | 9/2005 | Fox | ...................... | A01D 46/084 |
| | | | | 100/88 |
| 7,549,279 B2* | 6/2009 | Merant | ................ | A01B 59/063 |
| | | | | 56/15.6 |
| 9,301,448 B2* | 4/2016 | Ramaekers | ............ | A01D 46/12 |
| 9,787,225 B2* | 10/2017 | Lucas | .................. | A01D 69/025 |
| 10,130,034 B2* | 11/2018 | Marchesan | ............ | A01D 45/10 |
| 2008/0022648 A1* | 1/2008 | Fox | ........................ | A01D 46/08 |
| | | | | 56/341 |
| 2008/0295476 A1* | 12/2008 | Bertino | .................. | A01D 29/00 |
| | | | | 56/122 |
| 2010/0307121 A1* | 12/2010 | Marchini | ............... | A01D 75/28 |
| | | | | 56/63 |
| 2015/0359177 A1* | 12/2015 | Richard | ................ | A01D 45/10 |
| | | | | 56/14.7 |
| 2016/0257360 A1* | 9/2016 | Mackenzie | ............ | B62D 21/11 |
| 2018/0263198 A1* | 9/2018 | Bertino | .................. | A01G 18/70 |

* cited by examiner

MODULAR MOUNTING SYSTEM FOR A COTTON HARVESTER

FIELD OF THE DISCLOSURE

The present disclosure relates to a frame assembly, and in particular, to a modular frame assembly system for a cotton harvester.

BACKGROUND OF THE DISCLOSURE

Many work machines require a rigid frame assembly to couple the components of the work machine thereto. In turn, the components of the work machine interact with one another or the surrounding environment to perform a work function. Cotton harvesters specifically rely on a substantially rigid frame assembly to properly locate the various components on the frame assembly. More specifically, a cotton harvester often has a plurality of wheels, a prime mover, a header, an accumulator, a feeder, a module builder, and bale handler coupled thereto. The spatial orientation of many of the components relative to one another effects the overall picking and baling efficiency of the work machine. For example, if the feeder is positioned too close to the baler, corresponding belts may contact one another. Alternatively, if the feeder is positioned too far from the baler, harvested cotton may fall through gaps between the feeder and the baler.

Many work machines utilize a plurality of fasteners, brackets, and the like to couple the various components of the work machine to the frame. Often, many fasteners and brackets are coupled to one another to ultimately couple the component to the frame. Each fastener or bracket coupled between the frame and component adds an uncertainty to the spatial relationship of the component relative to the frame. Accordingly, the more fasteners, brackets, and the like utilized to fasten the component to the frame the greater the uncertainty of the spatial positioning of the components relative to the frame. Often, the uncertainty of the spatial orientation of the components on the frame requires additional steps during manufacturing to ensure the final spatial relationship of the components relative to the frame and other components is correct for proper work machine function. Further, the plurality of fasteners and brackets create additional potential for movement of the attached components relative to the frame and other components.

Traditional work machines have prime movers that are coupled to rigid components of the frame or sub frame. This coupling configuration causes vibrational inputs acting directly on the frame. The vibrational inputs are transferred to the frame itself and to the components coupled thereto.

SUMMARY

One embodiment includes a frame assembly for a work machine having a primary frame member and a prime mover platform removably coupled to the primary frame member. Wherein the prime mover platform is configured to selectively couple a prime mover to the primary frame member.

One example includes a swing arm removably coupled to the primary frame member on a first end and removably coupled to the prime mover platform on a second end.

In another example the prime mover platform is removably coupled to the primary frame member with one or more pins.

One example includes a baler and feeder deck removably coupled to the primary frame member. One aspect of this example includes an accessories deck removably coupled to the primary frame member. Another aspect of this example has a cab deck removably coupled to the primary frame member. A different aspect of this example has a feeder and a baler coupled to the baler and feeder deck, wherein the baler and feeder deck positions the feeder a predefined distance from the baler. In yet another aspect of this example, a first location pin is defined in the primary frame member and a first location aperture defined in the baler and feeder deck, wherein the first location pin is positioned at least partially within the first location aperture when the baler and feeder deck is aligned with the primary frame member. Another aspect of this example has a second location pin defined in the primary frame member and a second location aperture defined in the baler and feeder deck, wherein the first location pin is positioned at least partially within the first location aperture and the second location pin is positioned at least partially within the second location aperture when the baler and feeder deck is aligned with the primary frame member.

Another embodiment includes a frame assembly for a baler having a primary frame member coupled to at least one ground engaging mechanism, a first deck coupled to the primary frame member, a feeder assembly coupled to the first deck, and a baler assembly coupled to the first deck.

One example of this embodiment has plurality of location pins positioned on the primary frame member and a plurality of location apertures positioned in the first deck, wherein each of the plurality of location pins are positioned at least partially in each one of the corresponding plurality of location apertures when the first deck is coupled to the primary frame member. Another aspect of this example has at least one fastener coupling the first deck to the primary frame member, wherein the plurality of location pins are maintained at least partially within the corresponding plurality of location apertures when the at least one fastener couples the first deck to the frame member.

Another example has a second deck coupled to the primary frame member, wherein the second deck is configured to be coupled to any one of a water tank, a lubricant reservoir, or a fuel tank.

Yet another example has a third deck coupled to the primary frame member, wherein the third deck is configured to be coupled to a cab.

Another example has a second deck coupled to the primary frame member and configured to be coupled to any one of a water tank, a lubricant reservoir, or a fuel tank and a third deck coupled to the primary frame member and configured to be coupled to a cab. One aspect of this example has a plurality of location pins positioned on the primary frame member and a plurality of location apertures positioned in the first deck, the second deck, and the third deck, wherein each of the plurality of location pins are positioned at least partially in one of the corresponding plurality of location apertures when the first deck, the second deck, and the third deck are coupled to the primary frame member.

In another example of this embodiment, a prime mover platform is removably coupled to the primary frame member and a swing arm is removably coupled to the primary frame member on a first end and removably coupled to the prime mover platform on a second end.

Yet another embodiment includes a cotton harvester assembly having a primary frame member, at least one ground engaging mechanism coupled to the primary frame member, a prime mover platform removably coupled to the primary frame member and configured to receive a prime mover, a cab deck removably coupled to the primary frame member, an accessories deck removably coupled to the primary frame member, a baler and feeder deck removably coupled to the primary frame member, a feeder assembly removably coupled to the baler and feeder deck, and a baler assembly removably coupled to the baler and feeder deck.

One example of this embodiment includes a plurality of location pins positioned on the primary frame member and a plurality of location apertures positioned in each of the cab deck, the accessories deck, and the baler and feeder deck, wherein each of the plurality of location pins are positioned at least partially in each one of the corresponding plurality of location apertures when the in the cab deck, the accessories deck, and the baler and feeder deck are coupled to the primary frame member.

Another example has a swing arm pivotally coupled to the primary frame member on a first end and pivotally coupled to the prime mover platform on a second end.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
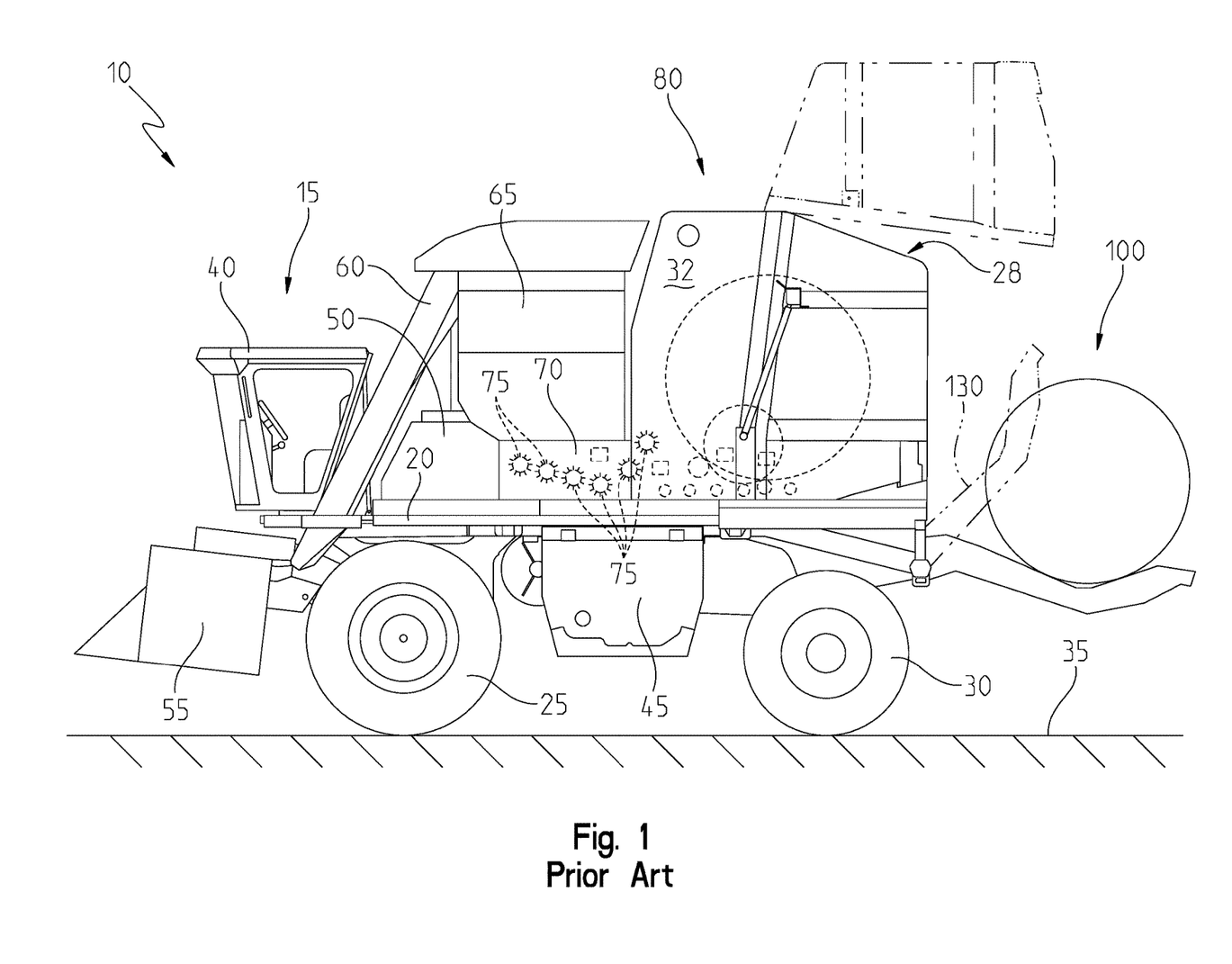
FIG. 1 is a side view of a cotton picker.

FIG. 1 illustrates a conventional harvester 10 according to one embodiment. The illustrated harvester 10 is a cotton picker 15. Alternatively, the harvester 10 may be a cotton stripper hay, corn stalk, or other crop harvester or not a crop harvester at all.

The harvester 10 includes a frame or chassis 20. The chassis 20 is supported by ground engaging mechanisms such as front wheels 25 and rear wheels 30. The harvester 10 is adapted for movement through a field 35 to harvest cotton, hay, corn stalks, or other crop. An operator station 40 is supported by the chassis 20. A power module 45 may be supported below the chassis 20. Water, lubricant, and fuel tanks, indicated generally at 50, may be supported on the chassis 20.

A harvesting structure 55 is coupleable to the chassis 20. The illustrated harvesting structure 55 are picker row units configured to remove cotton from the field 35. Alternatively, the harvesting structure 55 may be a cotton stripper header or configured to remove hay, corn stalks, or other crop. An air duct system 60 is coupleable to the harvesting structure 55. An accumulator 65 is coupleable to the air duct system 60. The accumulator 65 is configured to receive cotton, or other crop, from the harvesting structure 55 via the air duct system 60. A feeder 70 is coupleable to the chassis 20. The feeder 70 is configured to receive cotton, or other crop, from the accumulator 65. The feeder 70 includes a plurality of rollers 75 configured to compress the cotton, or other crop, and transfer the cotton, or other crop, to a round module builder 80.

A module handling system 130 is positioned adjacent the round module builder 80 for receiving a round module 100. The module handling system 130 temporarily supports the round module 100 and then discharges it from the harvester 10.

While a round module builder 80 is shown and described as part of the cotton picker 15, this disclosure is not limited to such an application. More specifically, other embodiments considered for this disclosure include, but are not limited to, any type of work machine having components coupled thereto. A person having skill in the relevant art understands how the teachings of this disclosure can be applied to any type of work machine having components coupled thereto and this disclosure is not limited in application to the cotton picker 15 shown and described herein.

Figure 2:
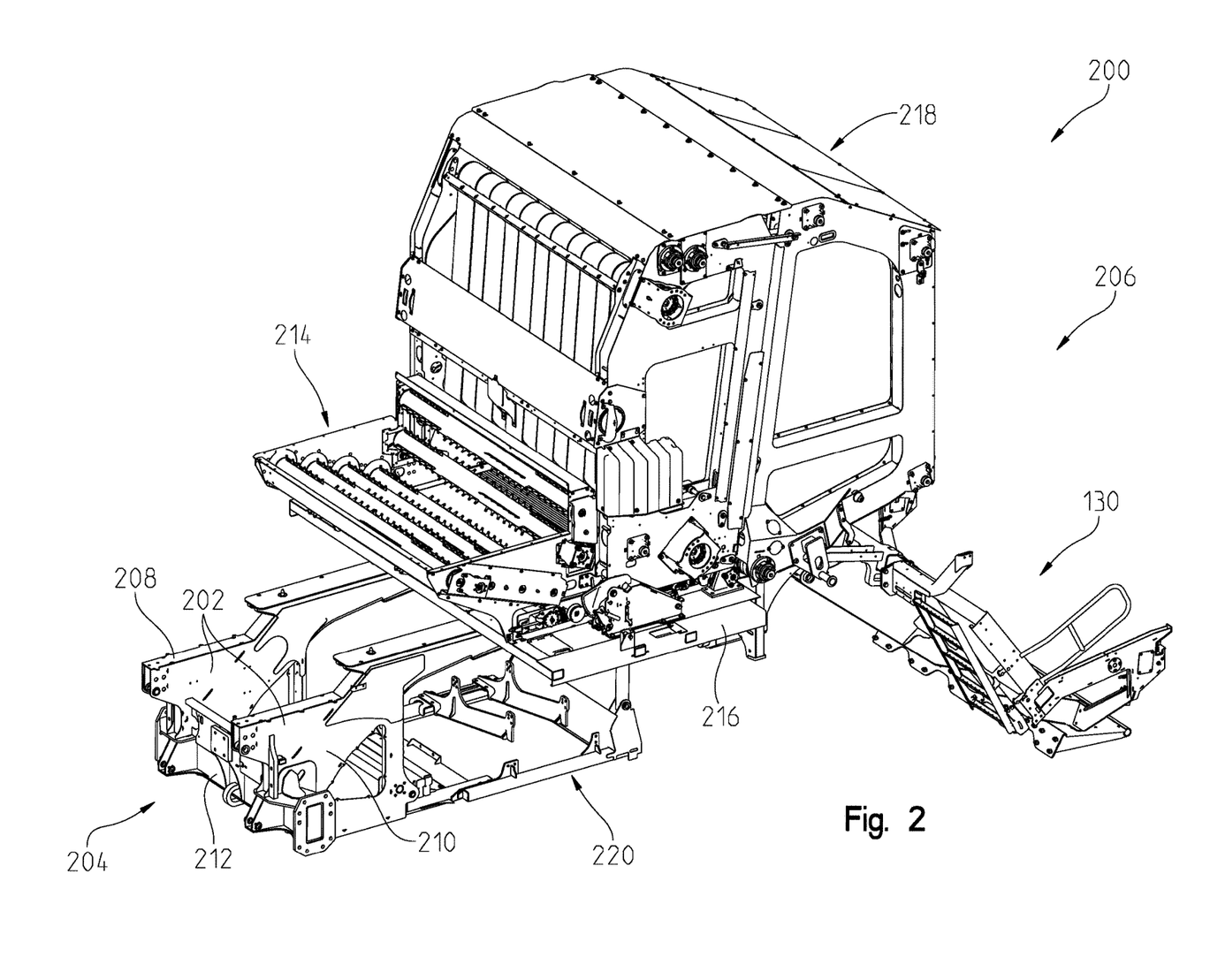
FIG. 2 is an elevated perspective view of a primary frame member with a feeder assembly and baler assembly coupled thereto.

Referring now to FIG. 2, one embodiment of a primary frame assembly 200 is illustrated with several components removed therefrom. More specifically, the primary frame assembly 200 may have a primary frame member 202 extending longitudinally from a front end 204 to a rear end 206. The primary frame member 202 may be formed from a first segment 208 and a second segment 210 spaced apart from one another with a plurality of cross-members 212. The first and second segments 208, 210 may be coupled to one another with the plurality of cross members 212 to form one substantially rigid primary frame member 202.

The first and second segments 208, 210 may be coupled to one another with the plurality of cross members 212 via any coupling method known in the art. More specifically, the plurality of cross members 212 may be coupled to the first and second segments 208, 210 with welds, rivets, nuts and bolts, or any other fastening mechanism known in the art. Further still, in one embodiment the first and second segments 208, 210 may be integrally formed from a single material along with the plurality of cross members 212.

The primary frame member 202 may also be formed of any material known in the art that is strong enough to withstand the expected loads on the frame member 202. For example, steel, aluminum, titanium, or the like are all considered herein as materials that could be utilized for the primary frame member 202. Further still, composites such as carbon fiber may also be used for the frame member 202. Accordingly, the particular material composition of the frame member 202 is not limiting, and many different types of materials are considered herein for forming the primary frame member.

Also illustrated in FIG. 2 is a feeder assembly 214 coupled to the primary frame member 202 via a feeder and baler deck 216. Also coupled to the feeder and baler deck 216 is a baler assembly 218. As illustrated in FIG. 2, both the feeder assembly 214 and the baler assembly 218 are coupled to the primary frame member 202 through the feeder and baler deck 216.

Also coupled to an underside of the primary frame member 202 may be a prime mover platform 220. The prime mover platform 220 may be configured to couple a power module or prime mover (not specifically shown), such as a gasoline or diesel engine, to the primary frame member 202. Further, the prime mover platform 220 may also provide a coupling location along with a gearbox, one or more pumps, a cooling package, and cotton air fans. The power module may provide power to the components of the cotton picker 15. More specifically, the power module may power all or any one of a drive system, the harvesting structure 55, the air duct system 60, the accumulator 65, the feeder assembly 214, the baler assembly 218, and the module handling system 130. Further, the power module may provide mechanical, hydraulic, and electrical power to any system of the cotton picker 15.

Figure 3:
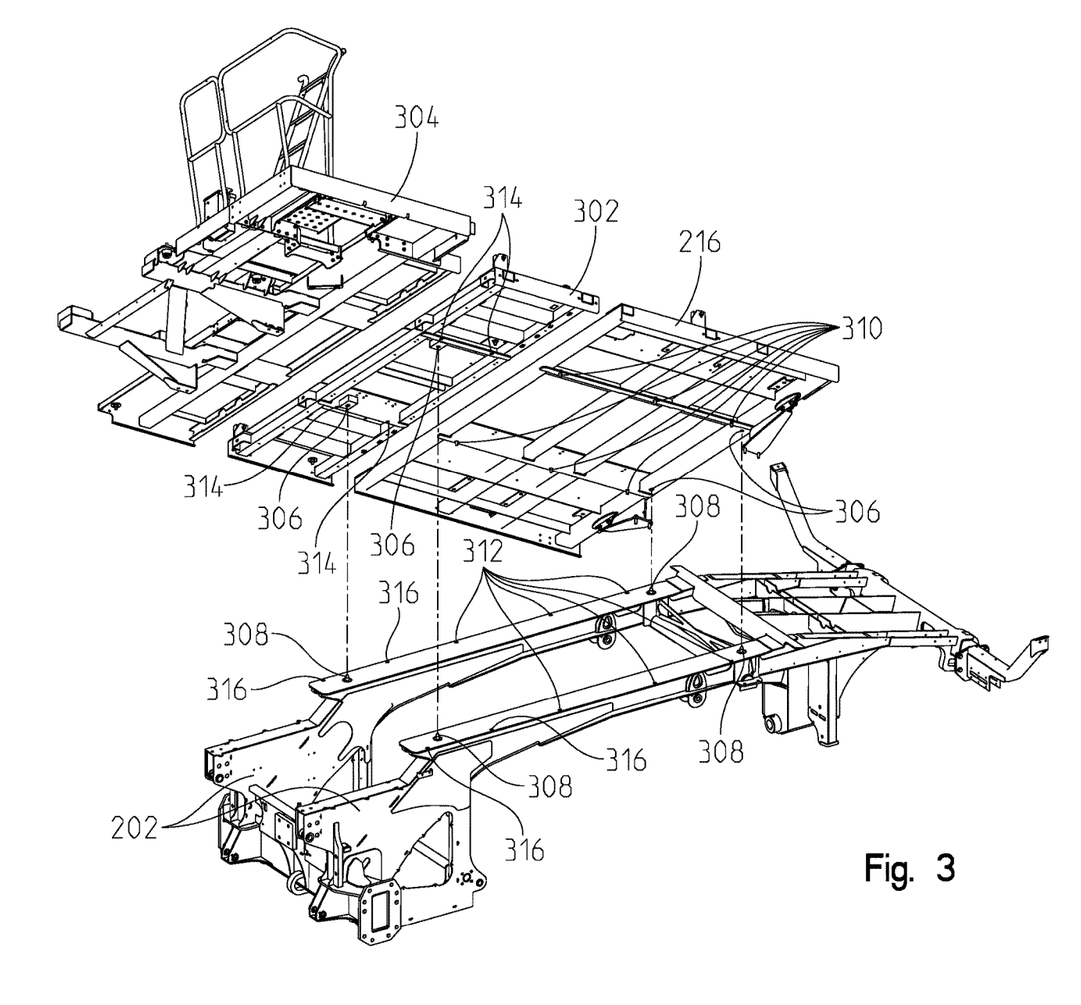
FIG. 3 is an elevated perspective view of the primary frame member of FIG. 2 with several decks expanded therefrom.

Referring now to FIG. 3, several platforms are shown spaced from the primary frame member 202. More specifically, the feeder and baler deck 216 is shown spaced from the primary frame member 202 with the feeder assembly 214 and the baler assembly 218 removed therefrom. Further, an accessories deck 302 and an operator station or cab deck 304 are also shown spaced from the primary frame member 202. Each of the feeder and baler deck 216, the accessories deck 302, and the cab deck 304 may be coupleable to the primary frame member 202 in a predefined location. More specifically, the feeder and baler deck 216 and the accessories deck 302 may have location apertures 306 positioned therein that correlate with location pins 308. When the corresponding deck 216, 302 is properly positioned adjacent to the primary frame member 202, the location pins 308 may be at least partially positioned in the corresponding location apertures 306.

In one aspect of the present disclosure, the primary frame member 202 may have a first location pin 308 positioned along the first segment 208 and a second location pin 308 positioned along the second segment 210 towards the rear end 206 of the primary frame member 202. Further, the feeder and baler deck 216 may have first and second location apertures 306 positioned to correspond with the first and second location pins 308 of the primary frame member 202. In this configuration, the feeder and baler deck 216 may only be coupleable to the primary frame member 202 when the location apertures 306 are properly aligned with the first and second location pins 308. In other words, the feeder and baler deck 216 cannot be properly coupled to the primary frame member 202 without the location pins 308 being at least partially located within the corresponding location apertures 306.

The feeder and baler deck 216 may also have one or more baler deck through-holes 310 positioned thereon that correspond with one or more frame through-holes 312 defined in the primary frame member 202. When the feeder and baler deck 216 is positioned with the location pins 308 in the corresponding location apertures 306, the baler deck through holes 310 may be aligned with the frame through-holes 312. Further still, fasteners may utilized through the deck through holes 310 and the frame through-holes 312 to couple the feeder and baler deck 216 to the primary frame member 202. In other words, while the location pins 308 and location apertures 306 may properly position the feeder and baler deck 216 on the primary frame member 202, the fasteners positioned through the corresponding through-holes 310, 312 may couple the feeder and baler deck 216 to the primary frame member 202.

The primary frame member 202 may also have a third location pin 308 positioned along the first segment 208 and a fourth location pin 308 positioned along the second segment 210 towards the front end 204 of the primary frame member 202. Further, the accessories deck 302 may have a third and fourth location apertures 306 positioned to correspond with the third and fourth location pins 308 of the primary frame member 202. In this configuration, the accessories deck 302 may only be coupleable to the primary frame member 202 when the location apertures 306 are properly aligned with the third and fourth location pins 308. In other words, the accessories deck 302 cannot be properly coupled to the primary frame member 202 without the third and fourth location pins 308 being at least partially located within the corresponding third and fourth location apertures 306.

The accessories deck 302 may also have one or more accessories deck through-holes 314 positioned thereon that correspond with one or more frame through-holes 316 defined in the primary frame member 202. When the accessories deck 302 is positioned with the location pins 308 in the corresponding location apertures 306, the accessories deck through holes 314 may be aligned with the frame through-holes 316. Further still, fasteners may be utilized through the deck through holes 314 and the frame through-holes 316 to couple the accessories deck 302 to the primary frame member 202. In other words, while the location pins 308 and location apertures 306 may properly position the accessories deck 302 on the primary frame member 202, the fasteners positioned through the corresponding through-holes 314, 316 may couple the accessories deck 302 to the primary frame member 202.

A person skilled in the relevant art understands that the location pins 308 and corresponding location apertures 306 may provide increased certainty of the spatial positioning of the corresponding decks 216, 302 relative to the primary frame member 202 compared to utilizing fasteners alone. More specifically, the location pins 308 and location apertures 306 may be manufactured and positioned to ensure that when the corresponding decks 216, 302 are properly positioned on the primary frame member 202 they cannot substantially move relative thereto. Further, once the position pins 308 are disposed at least partially within the corresponding location apertures 306, fasteners or the like can couple the decks 216, 302 to the primary frame member 202.

While two location pins 308 and location apertures 306 are shown and described herein, this disclosure is not limited to such a configuration. In other embodiments, three or more location pins 308 and corresponding location apertures 306 may be used for each deck 216, 302 and this disclosure is not limited to the two pins 308 and apertures 306 per deck described herein. Further, while pins and holes have been described throughout, other corresponding shapes may be used as well and are considered. For example, rectangular blocks and corresponding apertures or the like may be used instead of the pins and holes described above. A person skilled in the relevant art understands that any shape and corresponding aperture can by utilized to specifically locate the deck on the primary frame, and this disclosure is not limited to any particular shape or corresponding aperture.

Further, while the pins are shown and described as extending from the primary frame, they may also, or alternatively, extend from the corresponding deck. In this embodiment, the primary frame member may have corresponding location holes that align with the pins of the deck when properly positioned thereon. In another embodiment, one pin may extend from the primary frame member on one side and one pin may extend from the deck on the other side. Accordingly, this disclosure considers many different pin and location hole configurations and is not limited to those shown and described.

Figure 4:
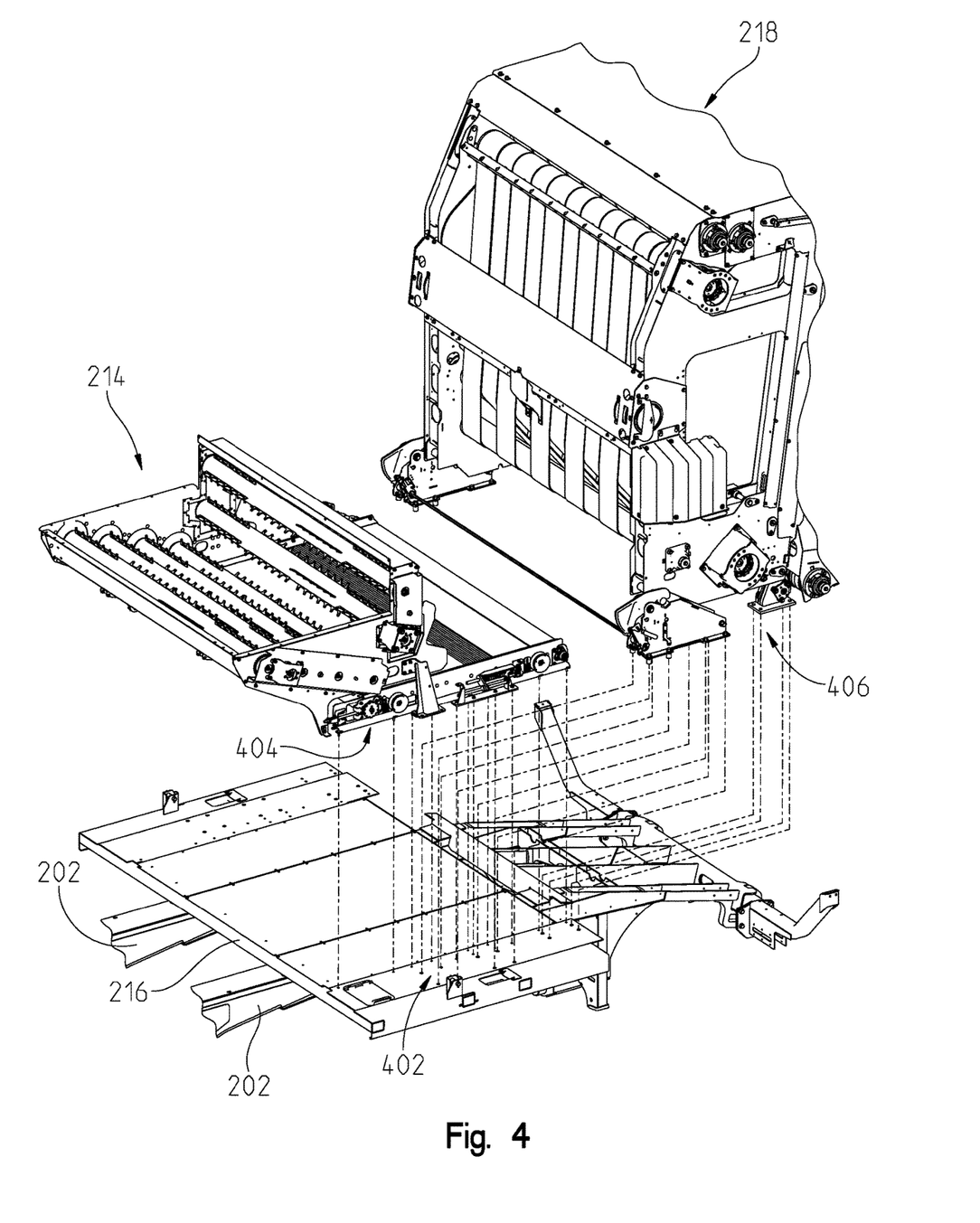
FIG. 4 is a partial view of the primary frame member, feeder assembly, and baler assembly of FIG. 2, with the components expanded from one another.

Referring now to FIG. 4, the positioning of the feeder assembly 214 and the baler assembly 218 on the feeder and baler deck 216 is more clearly shown. More specifically, a plurality of feeder and baler through-holes 402 are shown on one end of the feeder and baler deck 216. A plurality of feeder through-holes 404 are also shown defined through one portion of the feeder assembly 214 and a plurality of baler through-holes 406 are shown defined through a portion of the baler assembly 218. The feeder and baler through-holes 402 may be formed in one integral component of the feeder and baler deck 216. Accordingly, the plurality of feeder through-holes 404 and the plurality of baler through-holes 406 may be aligned with the corresponding plurality of feeder and baler through-holes 402 of the deck 216. When the through-holes 402, 404, 406 are properly aligned, fasteners or the like may be positioned therethrough to couple the feeder assembly 214 and the baler assembly 218 to the feeder and baler deck 216, and in turn to the primary frame member 202.

In one aspect of this embodiment, the spatial orientation of the feeder assembly 214 relative to the baler assembly 218 is predictably maintained because each of the assemblies 214, 218 are coupled to the same components of the feeder and baler deck 216. In this configuration, both the feeder assembly 214 and the baler assembly 218 are coupled to the primary frame 202, in part, through the same component, the feeder and baler deck 216. This configuration may reduce the number of couplers and brackets required to couple the feeder assembly 214 and baler assembly 218 to the primary frame 202. Further, since both the feeder assembly 214 and the baler assembly 218 are coupled to the same integral component, the spatial relationship of the two assemblies 214, 218 may be maintained and the number of stacked uncertainties is reduced.

Figure 5:
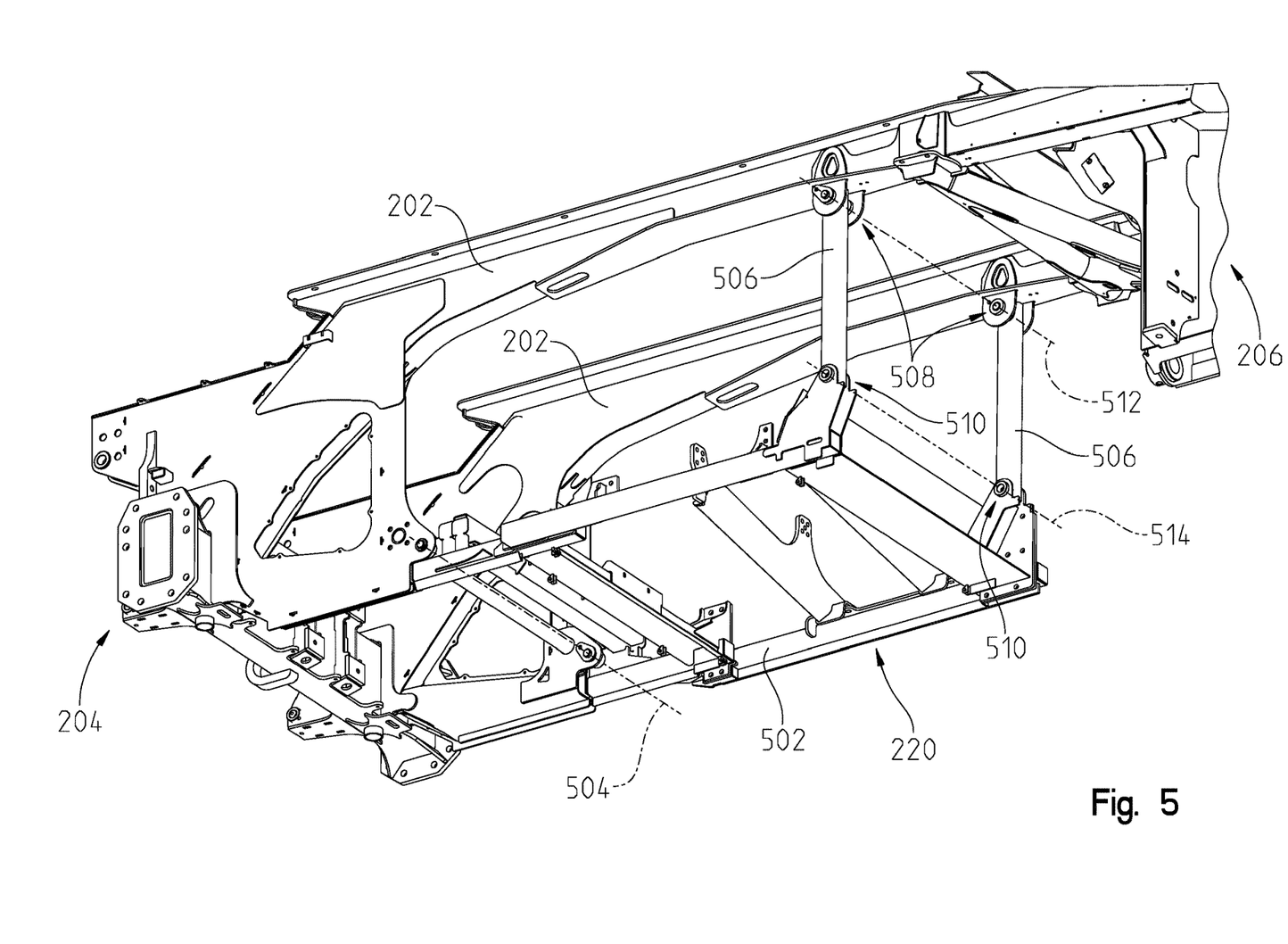
FIG. 5 is a lowered perspective view of a prime mover platform coupled to the primary frame member.

Referring now to FIG. 5, a partial view of the prime mover platform 220 coupled to the primary frame member 202 is illustrated. More specifically, a prime mover platform 502 is shown removably coupled to the primary frame member 202 at a front pivot axis 504 and removably coupled to two swing arms 506 towards the rear end 206. The swing arms 506 are removably coupled to the primary frame member 202 on a first end 508 and removably coupled to the prime mover platform 502 at a second end 510. In one aspect of this embodiment, the prime mover platform 502 is removably coupled to the primary frame member 202 via pins 602 (FIG. 6) positioned along the front pivot axis 504, and at the first and second end 508, 510.

The pins 602, however, may not rigidly couple the corresponding portions of the prime mover platform 202 to the primary frame member 202. Rather, the pins 602 may allow minor angular displacement about respective axis 504, 512, 514. In the non-limiting example shown in FIG. 5, the prime mover platform 502 may be substantially constrained from rotating substantially out of alignment with the primary frame member 202 without being rigidly coupled thereto. More specifically, the prime mover platform 502 may be pivotally coupled to the primary frame member 202 at the front pivot axis 504, but the swing arms 506 may restrict the prime mover platform 502 from rotating substantially about the front pivot axis 504 when they are pivotally coupled to the prime mover platform 502 and the primary frame member 202.

Similarly, the first ends 508 of the swing arms 506 may be pivotally coupled to the primary frame member 202 about a first pivot axis 512 and the second end 510 of the swing arms 506 may be pivotally coupled to the prime mover platform 502 at a second pivot axis 514. Similarly to the coupling configuration described above for the front pivot axis 504, the prime mover platform 502 may be coupled via pins 602 at the first and second pivot axis 512, 514 but constrained from pivoting substantially relative to the primary frame members 202 because of the multiple coupling locations disclosed herein.

While the prime mover platform 502 may be free to pivot around any one of the axis 504, 512, 514 if not further constrained, by being pivotally coupled at each of the pivot axis 504, 512, 514 the prime mover platform 502 is substantially constrained relative to the primary frame member 202. In one aspect of this disclosure, a prime mover or power module is coupled to the prime mover platform 502. In this embodiment, certain vibrational inputs generated by the prime mover may be absorbed or otherwise addressed through the pivotal coupling of the prime mover platform 502 to the primary frame member 202 via the axis 504, 512, 514. In other words, the prime mover platform 502 may maintain proper position of the prime mover relative to the primary frame member 202 without being rigidly coupled thereto.

Figure 6:
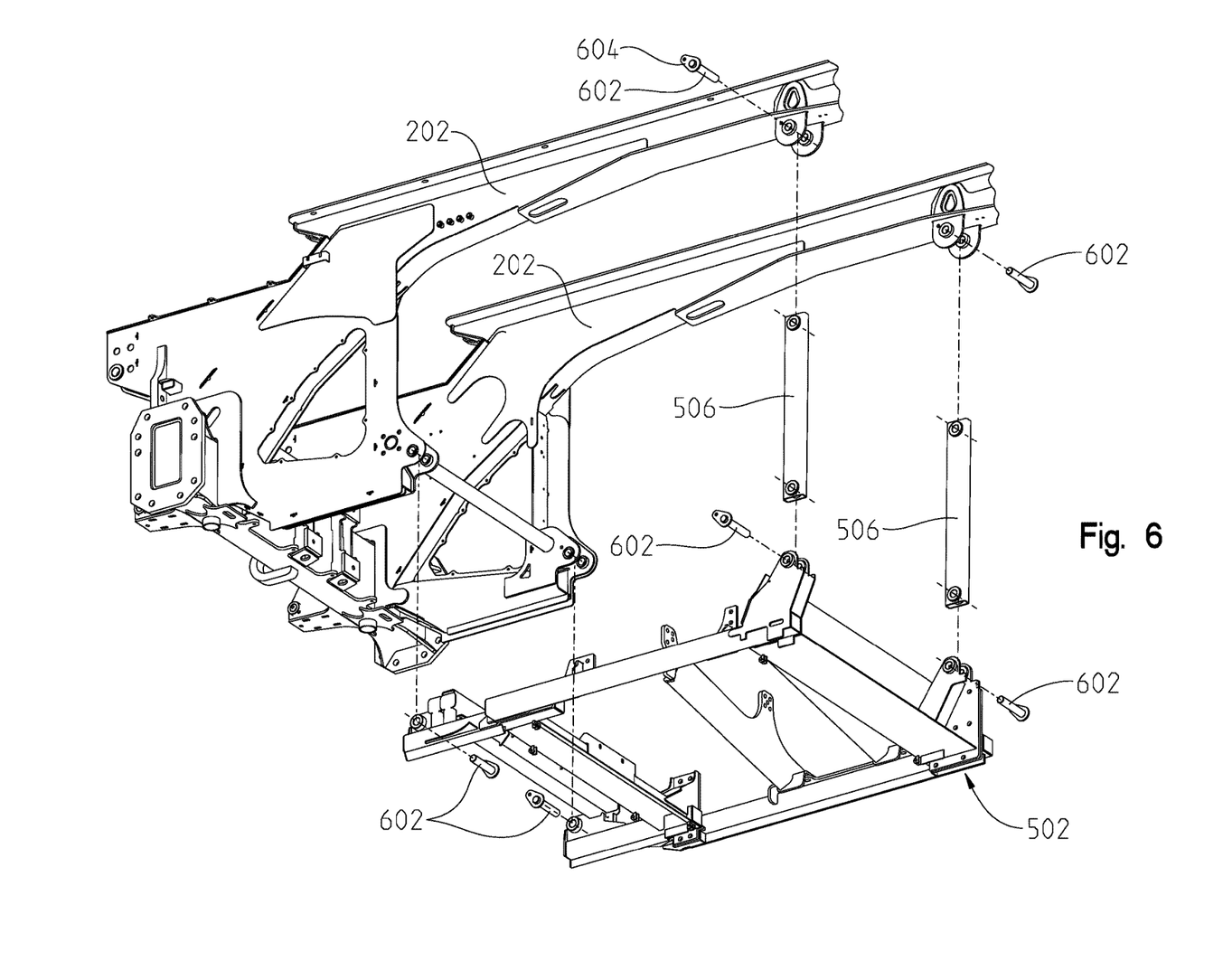
FIG. 6 is an expanded view of the prime mover platform of FIG. 5.

Referring now to FIG. 6, an exploded view of the prime mover platform 502 is illustrated. More specifically, this exemplary embodiment shows pins 602 pivotally coupling the prime mover platform 502 to the primary frame member 202. The pins 602 may have a flange 604 positioned thereon that allows the pins 602 to be coupled to the primary frame member 202 while coupling the prime mover platform 502 or the corresponding swing arms 506 to the primary frame member 202. In one non-exclusive example, the flange 604 may have a through-hole positioned therethrough. When the pin 602 is properly positioned in the primary frame member 202, the through-hole of the flange 604 may be aligned with a corresponding through-hole in the primary frame member 202. Further, a fastener may be coupled through the through-hole of the flange 604 to couple the pin 602 to the primary frame member 202. In this configuration, the pin 602 may be coupled to the primary frame member 202 via the fastener through the flange through-hole.

While pins 604 with flanges are described herein, this disclosure is not limited to any particular type of pin utilized to couple the prime mover platform 502 to the primary frame member 202 and the swing arms 504. More specifically, other embodiments may utilize fasteners with an expanded head on one end and a threaded shaft on the other. A smooth bore may be defined between the expanded head and the threaded shaft. In this configuration, the smooth bore portion of the fastener may be positioned along the contact points for the prime mover platform 502 to allow the prime mover platform 502 to pivot smoothly thereon.

In other embodiments, one or more bearing may be positioned along the axis 504, 512, 514 in any of the prime mover platform 502, the primary frame mover 202, or the swing arms 506. The bearings may be any type of bearing known in the art and this disclosure is not limited to any particular type of bearing. In yet another embodiment, dampening bushings may be positioned between the prime mover platform 502 and the swing arms 506 and primary frame member 202 at the pivot axis 504, 512, 514. In this embodiment, the dampening bushings may allow the prime mover platform 502 to pivot slightly about the pivot axis 504, 512, 514 during vibrational inputs while simultaneously allowing the prime mover platform 502 to vibrate therein.

In other words, prime mover platform 502 may be mounted to the primary frame member 202 to allow the primary frame member 502 to pivot or otherwise move slightly about the pivot axis 504, 512, 514 during vibrational inputs. More specifically, cyclic forces produced by a prime mover coupled to the prime mover platform 502 may be addressed by allowing minor movement of the prime mover platform 502 relative to the primary frame member 502.

While the feeder and baler deck 216 have been described in detail above, the accessories deck 302 may also provide similar coupling features for other components of the cotton picker 15. More specifically, the accessories deck 302 may provide a single coupling location for other components of the cotton picker 15 such as the accumulator 65, and water, lubricant, and fuel tanks 50 in the case of a cotton picker. If the accessories deck 302 is part of a cotton stripper, it may be configured to accommodate a cotton cleaner. Accordingly, the accessories deck 302 may accommodate different types of accessories or the like depending on the type of work machine it is utilized on. This disclosure is not limited to the particular types of work machine specifically shown and described herein but rather considers applying these teachings to a plurality of different types of work machines and the like.

Similarly, the cab deck 304 may provide a single deck for the operator station 40 or cab to be coupled to. Further, the cab deck 304 may also implement location pins 308 and corresponding apertures 306 similar to those described for the accessories deck 302 and the feeder and baler deck 216.

In one aspect of the present disclosure, the manufacturing process for the cotton picker 15 allows for painting and assembling the components of the cotton picker 15 in a piecemeal fashion. In one non-limiting example, the assembled cotton picker 15 may be too large to fit through a typical paint booth. However, the primary frame member 202 may have a width and length that is sized to fit into a typical paint booth or the like when the corresponding decks are not coupled thereto. Similarly, the decks 216, 302, 304 may be sized to fit through the paint booth. In this embodiment, the primary frame member 202 and the decks 216, 302, 304 may be individually painted prior to being coupled to one another.

Another aspect of this disclosure may allow manufacturing and assembling sub-components of the cotton picker 15 independently from one another. For example, the operators station 40 may be coupled to the cab deck 304 prior to coupling the cab deck to the primary frame member 202. Similarly, the accessories deck 302 may have the water tank, lubricant reservoir, and fuel tank coupled thereto prior to coupling the accessories deck 302 to the primary frame member 202. Further, the feeder and baler deck 216 may be coupled to the feeder assembly 214 and the baler assembly 218 prior to being coupled to the primary frame member 202. In this configuration, the components may be coupled to their corresponding decks 216, 302, 304 and transported to a separate location for final assembly to the primary frame member 202.

Further still, the overall number of fasteners used in the assembly process may be reduced through the use of the decks 216, 302, 304 described herein. More specifically, the pins 308 and location apertures 306 may substantially maintain proper orientation of the decks 216, 302, 304 relative to the primary frame member 202 and fasteners may only be used to secure the decks 216, 302, 304 to the primary frame member 202. In this configuration, the fasteners may not substantially be used for positioning the components of the cotton picker 15 relative to one another but rather be used to hold the corresponding decks 216, 302, 304 within proper alignment with the pins 308 and location apertures 306. Accordingly, a reduction of necessary fasteners may be realized.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A frame assembly for a work machine, comprising:
a primary frame member;
a prime mover platform removably coupled to the primary frame member; and
a swing arm coupled to the primary frame member on a first end and pivotally coupled to the prime mover platform on a second end;
wherein the prime mover platform is configured to selectively couple a prime mover to the primary frame member;
further wherein, the prime mover platform is pivotally coupled to a portion of the primary frame member on a first side and the swing arm on a second side to substantially constrain the orientation of the prime mover platform relative to the frame member.

2. The frame assembly of claim 1, further wherein the prime mover platform is pivotally coupled to the primary frame member with one or more pins.

3. The frame assembly of claim 1, further comprising a baler and feeder deck removably coupled to the primary frame member.

4. The frame assembly of claim 3, further comprising an accessories deck removably coupled to the primary frame member.

5. The frame assembly of claim 4, further comprising a cab deck removably coupled to the primary frame member.

6. The frame assembly of claim 3, further comprising a baler and a feeder coupled to the baler and feeder deck, wherein the baler and feeder deck positions the feeder a predefined distance from the baler.

7. The frame assembly of claim 3, further comprising a first location pin defined in the primary frame member and a first location aperture defined in the baler and feeder deck, wherein the first location pin is positioned at least partially within the first location aperture when the baler and feeder deck is aligned with the primary frame member.

8. The frame assembly of claim 7, further comprising a second location pin defined in the primary frame member and a second location aperture defined in the baler and feeder deck, wherein the first location pin is positioned at least partially within the first location aperture and the second location pin is positioned at least partially within the second location aperture when the baler and feeder deck is aligned with the primary frame member.

9. A frame assembly for a baler, comprising:
a primary frame member coupled to at least one ground engaging mechanism;

a first deck coupled to the primary frame member;
a feeder assembly coupled to the first deck;
a baler assembly coupled to the first deck;
a prime mover platform pivotally coupled to the primary frame member on one end; and
a swing arm pivotally coupled to the primary frame member on a first end and pivotally coupled to the prime mover platform on a second end;
wherein, the prime mover platform is pivotally coupled to the primary frame member and the swing arm to substantially constrain the orientation of the prime mover platform relative to the frame member.

10. The frame assembly for a baler of claim 9, further comprising at least one location pin positioned on the primary frame member and at least one location aperture defined in the first deck, wherein the location pin is positioned at least partially in the corresponding location aperture when the first deck is coupled to the primary frame member.

11. The frame assembly for a baler of claim 10, further comprising at least one fastener coupling the first deck to the primary frame member, wherein the location pin is maintained at least partially within the corresponding location aperture when the at least one fastener couples the first deck to the frame member.

12. The frame assembly for a baler of claim 9, further comprising a second deck coupled to the primary frame member, wherein the second deck is configured to be coupled to any one of a water tank, a lubricant reservoir, or a fuel tank.

13. The frame assembly for a baler of claim 9, further comprising a third deck coupled to the primary frame member, wherein the third deck is configured to be coupled to a cab.

14. The frame assembly for a baler of claim 9, further comprising:
a second deck coupled to the primary frame member and configured to be coupled to any one of a water tank, a lubricant reservoir, or a fuel tank; and
a third deck coupled to the primary frame member and configured to be coupled to a cab.

15. The frame assembly for a baler of claim 14, further comprising a plurality of location pins positioned on the primary frame member and a plurality of location apertures defined in the first deck and the second deck, wherein each of the plurality of location pins are positioned at least partially in one of the corresponding plurality of location apertures when the first deck and the second deck are coupled to the primary frame member.

16. A cotton harvester assembly, comprising:
a primary frame member;
at least one ground engaging mechanism coupled to the primary frame member;
a prime mover platform pivotally coupled directly to the primary frame member on one end and pivotally coupled to the primary frame member on the other end through a swing arm, the prime mover platform configured to receive a prime mover;
a cab deck removably coupled to the primary frame member;
an accessories deck removably coupled to the primary frame member;
a baler and feeder deck removably coupled to the primary frame member;
a feeder assembly removably coupled to the baler and feeder deck; and
a baler assembly removably coupled to the baler and feeder deck.

17. The cotton harvester assembly of claim 16, further comprising a plurality of location pins positioned on the primary frame member and a plurality of location apertures positioned in the accessories deck and the baler and feeder deck, wherein at least one of the plurality of location pins is positioned at least partially in each one of the corresponding plurality of location apertures when the accessories deck and the baler and feeder deck are coupled to the primary frame member.

* * * * *